(12) United States Patent
Malkin et al.

(10) Patent No.: US 6,704,048 B1
(45) Date of Patent: Mar. 9, 2004

(54) ADAPTIVE ELECTRONIC ZOOM CONTROL

(75) Inventors: Kenneth W. Malkin, Haverhill, MA (US); Larry K. Baxter, Stowe, VT (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 09/140,941

(22) Filed: Aug. 27, 1998

(51) Int. Cl.$^7$ .............................. G09G 5/00; H04N 7/14; H04N 5/225; H04N 5/262; G06K 9/32
(52) U.S. Cl. ................. 348/240.2; 348/14.1; 348/169; 382/299; 382/300; 345/798
(58) Field of Search ................................. 348/169, 170, 348/171, 172, 14.1, 14.15, 14.16, 147, 240.1, 240.2, 240.3; 382/256, 299, 300; 345/798

(56) References Cited

U.S. PATENT DOCUMENTS

| | | | |
|---|---|---|---|
| 4,282,546 A | | 8/1981 | Reitmeier ................. 358/22 |
| 4,963,981 A | * | 10/1990 | Todaka et al. ............ 348/240 |
| 4,996,592 A | | 2/1991 | Yoshida ..................... 358/85 |
| 5,359,363 A | | 10/1994 | Kuban et al. ............... 348/36 |
| 5,434,617 A | | 7/1995 | Bianchi .................... 340/170 |
| 5,475,426 A | * | 12/1995 | Kinugasa et al. .......... 348/240 |
| 5,479,203 A | * | 12/1995 | Kawai et al. ............. 348/14.1 |
| 5,570,177 A | * | 10/1996 | Parker et al. .............. 348/169 |
| 5,598,209 A | * | 1/1997 | Cortjens et al. .......... 348/14.1 |
| 5,684,532 A | * | 11/1997 | Ely ........................... 348/240 |
| 5,701,157 A | | 12/1997 | Kato et al. ................. 348/240 |
| 5,861,917 A | * | 1/1999 | Tariki et al. .............. 348/240 |
| 6,072,525 A | * | 6/2000 | Kaneda ................... 348/208.15 |
| 6,115,067 A | * | 9/2000 | Koyama .................... 348/240 |
| 6,128,033 A | * | 10/2000 | Friedel et al. ............ 348/14.1 |
| 6,172,707 B1 | * | 1/2001 | Ouchi et al. ............... 348/240 |
| 6,275,258 B1 | * | 8/2001 | Chim ........................ 348/169 |
| 6,297,846 B1 | * | 10/2001 | Edanami .................. 348/14.1 |
| 6,323,898 B1 | * | 11/2001 | Koyanagi et al. .......... 348/169 |
| 2002/0122121 A1 | * | 9/2002 | Fujii et al. ................. 348/240 |

FOREIGN PATENT DOCUMENTS

| | | | | |
|---|---|---|---|---|
| JP | 04126473 A | * | 4/1992 | .......... H04N/5/232 |
| JP | 08140079 A | * | 5/1996 | ............ H04N/7/15 |
| WO | WO 99/13638 | * | 3/1999 | .......... H04N/5/232 |

OTHER PUBLICATIONS

"An Electronic Zoom Video Camera Using Imager Scanning Control", Kinugusa et al., Aug. 1991, IEEE Transactions on Consumer Electronics, vol. 37, No. 3, pp. 501–505.*
Abstract, U.S. patent RE36,207, Issued May 4, 1999, Zimmermann et al.

* cited by examiner

*Primary Examiner*—Wendy R. Garber
*Assistant Examiner*—John M. Villecco
(74) *Attorney, Agent, or Firm*—Wong, Cabello, Lutsch, Rutherford & Brucculeri, L.L.P.

(57) ABSTRACT

An adaptive electronic zoom system is described which includes an electronic camera having an image sensor with pixels, a controller communicating with an address generator to select in response to an external input or feedback signals from the electronic camera a subset of pixels from the pixels of the image sensor, the subset of pixels defining a zoom area. The zoom area can be located at any position within the image sensor area. The zoom ratio/pan/tilt of the zoom area is automatically adjusted so as to maintain the location of the zoom area entirely within the image sensor area. The adaptive electronic zoom system is particularly suited for set-top boxes for video conferencing applications.

26 Claims, 8 Drawing Sheets

ADAPTIVE ELECTRONIC ZOOM CONTROL

FIELD OF THE INVENTION

The invention relates to a method of providing electronic zoom and electronic pan and tilt capabilities in digital imaging applications, and more particularly to an electronic camera wherein the electronic zoom and electronic pan and tilt functions are seamlessly interfaced.

BACKGROUND OF THE INVENTION

Electronic cameras which can be moved mechanically to rotate about a vertical axis (pan), about a horizontal axis (tilt) and to change the magnification of the displayed imaged by changing the focal length of the camera lens (zoom) are known in the art. Since mechanical control of pan, tilt and zoom ("MPTZ") is rather expensive, electronic cameras have been developed which exclusively utilize solid state components to pan, tilt, and zoom. An electronic pan, tilt, zoom ("EPTZ") camera is small, fast, inexpensive, quiet, reliable, durable, easy to manufacture and easy to upgrade. If the requirements for resolution and image quality are modest, such as in most video conferencing applications, such cameras can have an imaging lens with a fixed focus and a stationary support, i.e., no mechanical movement of the camera body or of components within the camera.

In MPTZ cameras, panning, tilting and zooming are performed independently of each other. For example, if the camera is panned to the right as far as it can go, the lens is still free to zoom out and in to any position, from full wide angle to full telephoto, which can represent a factor of 25 to 30 in image magnification. On the other hand, in a stationary EPTZ camera having a fixed focus setting, panning, tilting and zooming operations are performed by selecting electronically a subset of pixels from all the pixels of the camera's image sensor. The image is zoomed in by selecting the subset of pixels from, for example, one fourth of the image area, corresponding to a zoom ratio of 2, and the image is panned/tilted by locating the subset of pixels in different areas on the image sensor. Tilting/panning are therefore not completely independent of each other, since an image can be panned/tilted only so far, until an edge of the subset of pixels of the zoomed image reached the edge of the image sensors. For example, if the camera is zoomed out to the widest possible view (full wide angle), then all pixels of the camera's image sensor contribute to the image to be displayed so that electronic panning or tilting is not possible since otherwise the subset of pixels would fall outside the pixel area of the image sensor. In a different situation, if the camera is zoomed in so that the subset of pixels is smaller than the pixel area of the image sensor and the image is subsequently electronically panned and/or tilted by forming the subset of pixels from pixels which are located closer to a lateral edge of the image sensor, the image can only be panned and/or tilted until an edge of the subset of pixels overlaps with the lateral edge of the image sensor. Alternately, if an image which is panned or tilted, is subsequently zoomed out, the image can only be zoomed out until an edge of the subset of pixels hits the lateral edge of the image sensor.

Conventional MPTZ camera adjustments are usually performed in a particular order. For example, starting at full wide view, a user would typically frame an object on, for example, the right side of the field of view by first panning the camera mechanically until the object is centered. The user would then zoom in until the object is framed with the desired magnification (zoom ratio). However, since an EPTZ camera in full wide view cannot pan or tilt, as described above, the user would first have to zoom in, with the possibility that the object moves out of the frame; the user would subsequently pan to the right, bringing the object back into the frame, then make final zoom adjustments, possibly switching back and forth between panning and zooming to bring the object close to a position which is centered in the displayed image. This process can be time consuming and frustrating.

It is therefore an object of the present invention to overcome these disadvantages by integrating in an EPTZ camera the zoom function with the pan and tilt function.

SUMMARY OF THE INVENTION

The object of the invention is solved by an electronic zoom system which includes an electronic camera with an image sensor with pixels, a controller communicating with an address generator to select a subset of pixels from the pixels of the image sensor, with the subset of pixels defining a zoom area. The zoom area can be located at any position within the image sensor area, with the defining pan and tilt of the zoom area. The zoom ratio/pan/tilt of the zoom area is automatically adjusted so as to maintain the location of the zoom area entirely within the image sensor area.

In an advantageous embodiment, the controller supplies data to the address generator to adjust the zoom ratio as a function of the respective pan and tilt position so that the zoom area is located entirely within the imager area. For example, if the image pans and/or tilts so far that a lateral edge of the zoom area abuts the lateral edge of the image sensor, then the image can continue to pan and/or tilt while at the same time, the image is zoomed in, i.e., the size of the subset of pixels is decreased, so that the lateral edge of the zoom area is prevented from crossing over the lateral edge of the image sensor. The zoom/pan/tilt operation is here completely linked and integrated so that the user or an automatic system, as mentioned above, will only have to select and electronically "aim" at the object to be imaged.

In another advantageous embodiment, the scaler automatically adjusts the pan and/or tilt position if a panned and/or tilted image is subsequently zoomed out (i.e., demagnified), so that the lateral edge of the zoom area is prevented from crossing over the lateral edge of the image sensor.

In yet another advantageous embodiment, the electronic camera is incorporated in a set-top box for video conferencing and has preferably an imaging lens with a fixed focal length.

In still another advantageous embodiment, the zoom system is responsive to characteristic image attributes, such as movement of an object, or environmental settings, such as sound or optical signals, e.g., a light beam emitted by a pointer.

In another advantageous embodiment, the electronic zoom/pan/tilt functions are incorporated in a scanner adapted to scan, for example, photographic images. A user can then use, for example, the control commands available on the user interface to zoom and pan/tilt the displayed image and the control electronics automatically adjusts, if necessary, at least one of the zoom ratio and the pan/tilt positions in response to changes in the other, so that no portion of the zoom area is located outside the image area.

The invention advantageously also provides a method for electronically zooming, panning and tilting an image. A zoom area is selected from an image area together with a pan and/or tilt position of the zoom area. When the displayed image is to be changed, a combination of the zoom area and the pan and/or tilt positions are adjusted so that no portion of the zoom area is located outside the pixel area of the imager.

BRIEF DESCRIPTION OF THE DRAWING

Other objects, features, and advantages of this invention will be described in the following detailed description with reference to preferred embodiments and the appended drawings, in which.

DESCRIPTION OF THE PREFERRED EMBODIMENTS

Figure 1:
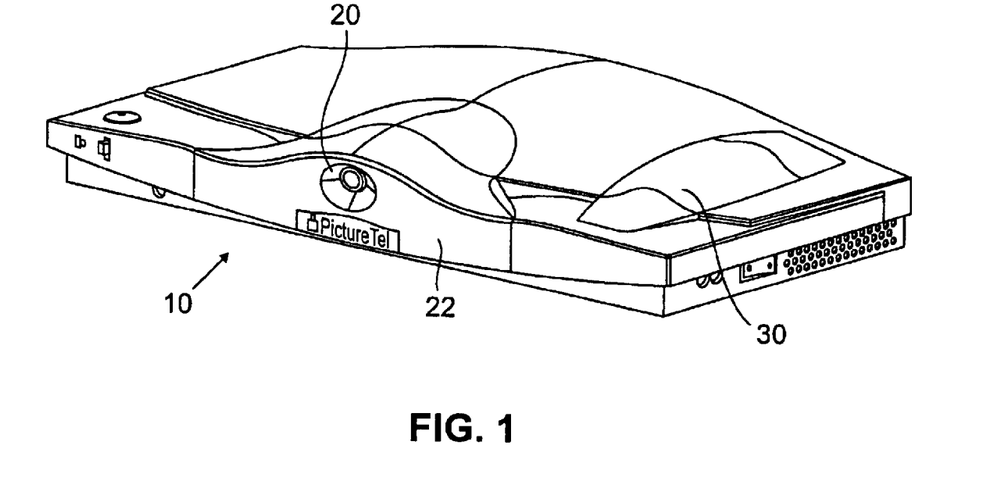
FIG. 1 is a front view of a set-top box incorporating an electronic zoom control of the invention.
Figure 2:
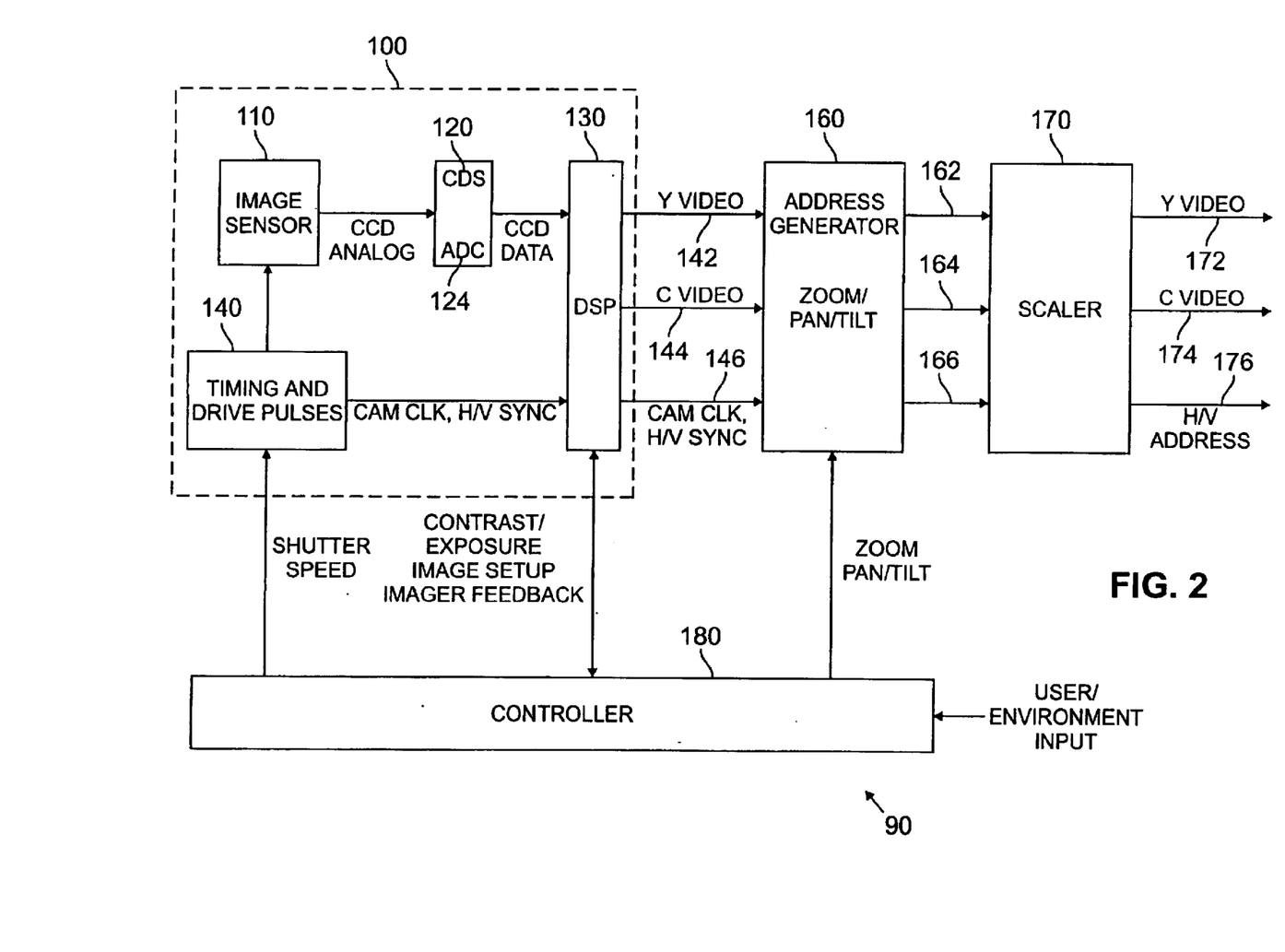
FIG. 2 is a block diagram of an embodiment of an adaptive electronic zoom control in accordance with the invention.

Referring first to FIGS. 1 and 2, there is illustrated a set-top box 10 incorporating in a camera 20 the adaptive electronic zoom control system 90 of the invention. The camera 20 has preferably a lens with fixed focal length and, in the present embodiment, no mechanical movement, so that zooming, panning and tilting are performed entirely electronically. The set-top box 10 can also incorporate an optical receiver 22 for receiving an external optical input, for example an IR signal from a remote control unit (not shown) or a laser pointer (not shown). The set-top 10 box can also be enabled to receive acoustical input through a built-in microphone 30, which is preferably directional. Remote microphone(s) can also be used (not shown). The camera 20 can then automatically electronically pan, tilt and zoom to capture an image of a speaker in response to signals received from the directional microphone 30 or from the respective remote microphone(s) positioned close to a speaker (not shown). It will be appreciated that the image sensor 110 itself can also be used instead of or in addition to input from the optical receiver 22 or the microphone(s) for identifying an object to be imaged. The camera 20 can also be directed to image an object (that is to automatically pan/tilt/zoom) by predetermined characteristic features of the image being acquired, such as distinct colors, movement, etc.

The set-top box 10 is preferably placed on top of a video monitor (not shown), with a video output signal received from the set-top box 10 connected to a monitor (not shown), for example, via a cable (not shown).

In FIG. 2, there is illustrated in the form of a block diagram an exemplary embodiment of an electronic zoom system 90 having electronic pan and tilt capability, with an electronic camera module 100, an address generator 160 for selecting pixel addresses of a zoomed, panned and tilted portion of an image acquired by the electronic camera module 100 and a scaler 170 for scaling the zoomed, panned and tilted portion of an image so that it can be displayed in a conventional video format on a monitor (not shown). The camera module 100, the address generator 160 and the scaler 170 are in communication with a controller 180. In the present example, the address generator 160 is configured for user-controlled image magnification and repositioning of a zoomed image into different pan and tilt positions, as described below. The address generator 160 can also be controlled, for example, by signals from the image sensor itself, such as movement of the object to be imaged, or by environmental parameters, such as sounds and optical signals. A lens (not shown) focuses an image onto the active surface of an image sensor 110 which can be, e.g., a CCD type progressive scan imager chip. The image sensor 110 has an array of pixels arranged in the form of a matrix with, for example, 640 horizontal and 480 vertical pixels. The analog output of the image sensor 110 is processed conventionally with, for example, a correlated sampler (CDS) 120 to provide electrical signals which correspond to the illumination at any given pixel site of image sensor 110, including color information.

From the foregoing, it will be readily understood by those skilled in the art, that the invention can also be incorporated in a scanner (not shown) instead of a camera, performing essentially identical functions. Because of the superior image resolution, most scanners employ a linear image sensor (not shown) which successively scans the original image object line by line in a manner known in the art. The signals derived from the scanned image are then rearranged to form the equivalent of an area image. Consequently, the present invention can be applied with both area and linear image sensors as well as with images transmitted and/or stored in electronic form, e.g., images transmitted in a network.

Likewise, images transmitted electronically can also be zoomed/panned/tilted with the present invention. The camera module 100 is then replaced with a suitable receiver (not shown) providing video outputs Y video 142, C video 144, and H/V sync 146 in a manner known in the art. The embodiment is not separately indicated in FIG. 1. It will be appreciated by those skilled in the art that video signals other than Y/G, such as RGB, MPEG, etc., can be used interchangeably.

The analog signal is digitized in a high speed analog-to-digital converter (ADC) 124, such as the model CXD2311AR from Sony Corporation with a typical resolution of 8 or 10 bits, and is fed to a digital signal processor (DSP) 130 such as the model SAA8110 from Philips. The DSP 130 converts the CCD signal to standard luminance Y video signals and chrominance C video signals and also adjusts picture contrast, brightness (that is, exposure), color balance, and imager setup based on instructions received from controller 180. A timing and drive pulse generator 140, for example, a model CXD1267AN or CXD2452R from Sony Corporation, is responsive to controller 180 and outputs the drive signals needed by the image sensor 110 and the DSP 130, and sends cam clock pulses and horizontal and vertical sync pulses 146 to the address generator 160.

The address generator 160 responds to a control signals from controller 180 electronically changing the zoom ratio and/or pan and/or tilt position by selecting a subset of pixels from the pixel array of the image sensor 110. As mentioned above, this request can be initiated by a user or by a camera signal and/or by environmental parameters.

Figure 3A:
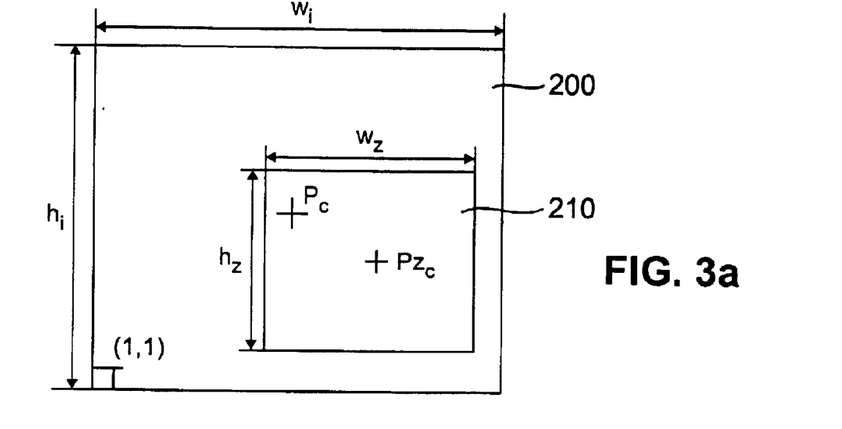
FIGS. 3a–c illustrate a panned and tilted zoomed-in pixel area located within the pixel area of the image sensor, with the pan position from FIG. 2a to FIG. 2c increasingly shifting to the right, associated with an increase in the zoom ratio.

Referring now to FIG. 3a, there is illustrated the complete image area 200 of the image sensor 110 comprising, for example, 640 pixels horizontally by 480 pixels vertically. The image sensor area 200 has a width $w_i$ and a height $h_i$, which can be expressed either in the form of linear dimensions or as the number of pixels, i.e., 640 and 480, respectively. The image sensor area 200 has a geometrical center $P_c$. A subset of pixels 210 with a geometrical center $Pz_c$ and a respective width $w_z$ and height $h_z$ is selected from the total number of pixels of the image sensor 110, representing a zoomed-in, panned and tilted image, hereinafter referred to as the "zoomed image." The zoom ratio can be expressed as $R_z = w_i/w_z = h_i/h_z$. It is assumed that the aspect ratio of the image is left unchanged, i.e., $h_i/w_i = h_z/w_z$, without limiting the scope of the invention. The pan position is $(Pz_c - P_c)_{horizontal}$ and the tilt position is $(Pz_c - P_c)_{vertical}$. In the present example, the zoomed image 210 of FIG. 3a is located completely within the image sensor area 200 so that the zoomed image 210 can be further zoomed in, panned and tilted. In the present example, with $R_z = 2$ and $(Pz_c - P_c)_{horizontal} = 100$ pixels horizontally and $(Pz_c - P_c)_{vertical} = -50$ pixels vertically, the subset of pixels of the zoomed image 210 represents the pixels between 260 and 580 horizontally and between 70 and 310 vertically, placing the origin (pixel 1, 1) at the lower left corner of the complete image area 200. The go address generator 160 generates the pixel addresses for the subset of pixels.

Figure 3B:
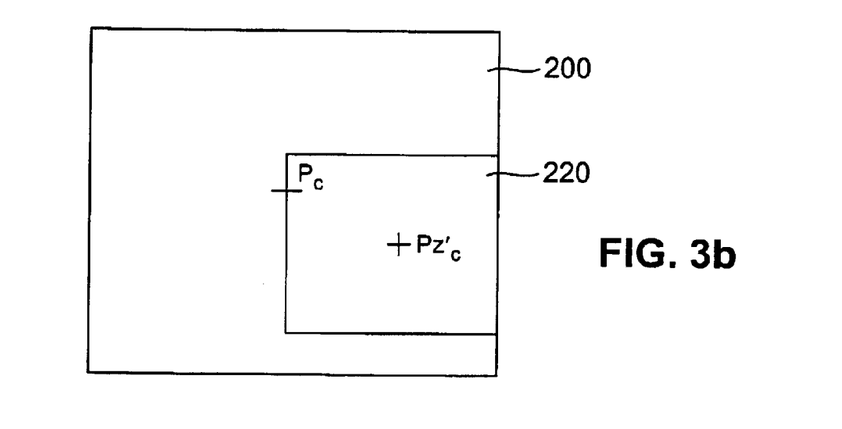

The zoomed image 220 of FIG. 3b is generated by electronically panning the zoomed image 210 of FIG. 3a farther to the right until the right vertical boundary of the zoomed image 220 coincides with the right vertical boundary of the image sensor 200. The center of the new pan position is denoted as $Pz'_c$. The zoom ratio is not changed. The tilt is also left unchanged to simplify the discussion. In this case, $(Pz'_c - P_c)_{horizontal} = 480$ pixels horizontally and $(Pz'_c - P_c)_{vertical} = -50$ pixels vertically, so that the subset of pixels of the zoomed image 220 represents the pixels between 320 and 640 horizontally and between 70 and 310 vertically. These addresses are then generated by the address generator 160.

The zoomed image 220 cannot be panned farther to the right without adjusting the zoom ratio, since the subset of pixels would then require pixels located to the right of the vertical boundary of the image sensor 200. According to the present invention, the zoom ratio is therefore automatically adjusted so as to keep the zoomed image within the boundaries of the image sensor 200. This situation is illustrated in FIG. 3c.

Figure 3C:
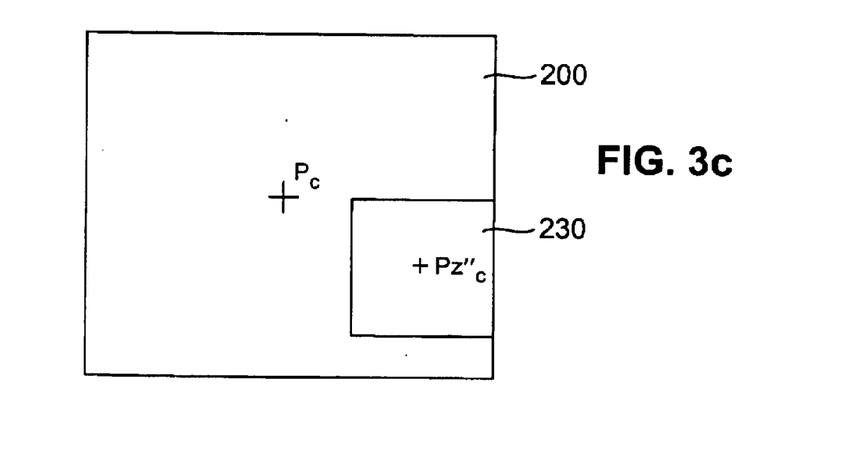

In FIG. 3c, it is assumed that the user desires to pan the image farther to the right to a new pan position $(Pz''_c - P_c)_{horizontal} = 540$ pixels while the tilt position remains at $(Pz''_c - P_c)_{vertical} = -50$ pixels. Since the zoomed image is already at the right edge of the image area 200, the system, according to the invention, automatically and continuously increases the zoom ratio $R_z$ from $R_z = 2$ to $R_z = 3.2$ to keep the right vertical boundary of the zoomed image 230 at the right vertical boundary of the image sensor 200. In this case, the subset of pixels of the final zoomed image 230 represents the pixels between 440 and 640 horizontally and between 115 and 265 vertically. The respective pixel addresses of this new subset of pixels are then generated by the address generator 160. It is understood that the allowable pan and/or tilt of the system is limited by the largest allowed zoom ratio which is determined, for example, by the desired image quality and image resolution.

The Y video signal 162, the C video signal 164 as well as the addresses 166 of the zoomed images 210, 220 and 230, respectively, are then passed on to the scaler 170 which "scales" the pixel count of zoomed images (i.e., 320×240 for images 210 and 220 and 200×150 for image 230) to the CIF format of 352×288 pixels for electronic transmission, to full video format of, for example, 640×480 pixels or to any other format desired for electronic manipulation, display, transmission or storage of the images by computing interpolated or decimated pixels values in a manner known in the art. The scaled Y video signal 172, the scaled C video signal 174 as well as the scaled addresses 176 of the full video image are supplied by scaler 170 to a display device (not shown).

Figure 4A:
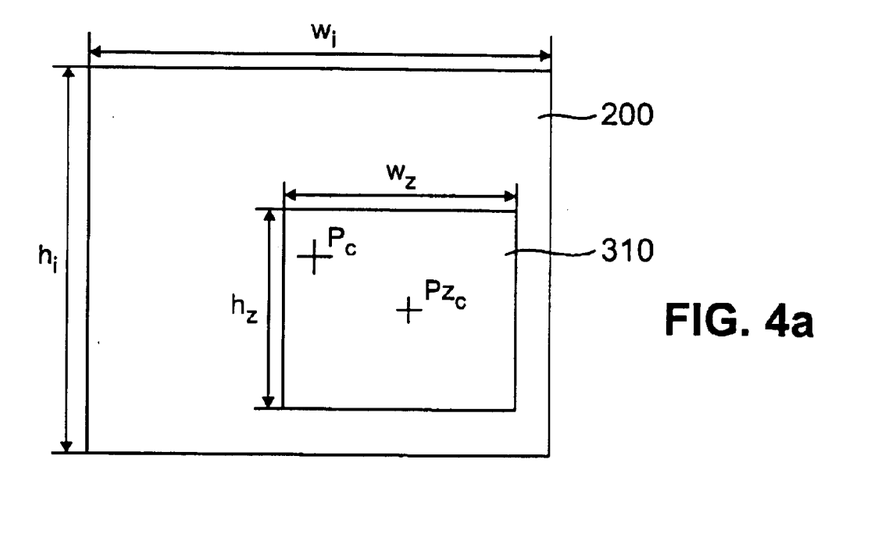
FIGS. 4a–d illustrate a panned and tilted zoomed-in pixel area located within the pixel area of the image sensor, with the zoom ratio decreasing from FIG. 3a to FIG. 3d, associated with a shift in the pan and tilt position.

In another aspect of the invention which is illustrated in FIGS. 4a–4d, the zoomed-in image 310 of FIG. 4a (which in the present example corresponds to the image 210 of FIG. 3a) is zoomed-out while initially leaving the pan/tilt position unchanged. The zoomed image 310 of FIG. 4a is located completely within the image sensor area 200 so that the zoomed image 310 can be at least initially zoomed out. In the present example, with $R_z = 2$ and $(Pz_c - P_c)_{horizontal} = 100$ pixels horizontally and $(Pz_c - P_c)_{vertical} = -50$ pixels vertically, the subset of pixels of the zoomed image 310 represents the pixels between 260 and 580 horizontally and between 70 and 310 vertically. These pixel addresses are, as before, generated by the address generator 160.

Figure 4B:
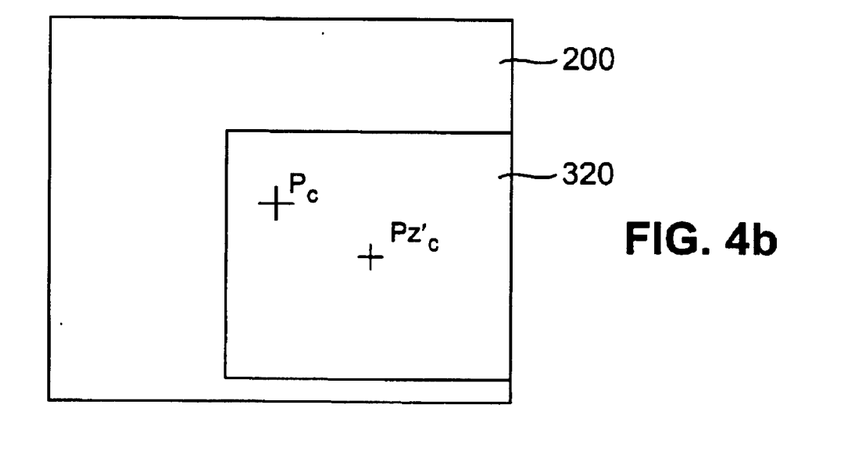

The zoomed image 320 of FIG. 4b is generated by zooming the zoomed image 310 of FIG. 4a out until, in this example, the right vertical boundary of the zoomed image 320 coincides with the right vertical boundary of the image sensor 200. The pan and tilt position $Pz_c$ is not changed. In the present example, a minimum zoom ratio $R_z$ of 1.45 can be attained without adjusting the pan and tilt position $Pz_c$. At that point, the right vertical boundary of the zoomed image 320 coincides with the right vertical boundary of the image sensor 200. The subset of pixels of the zoomed image 320 represents the pixels between 200 and 640 horizontally and between 25 and 355 vertically. These pixel addresses are, as before, generated by the address generator 160.

Figure 4C:
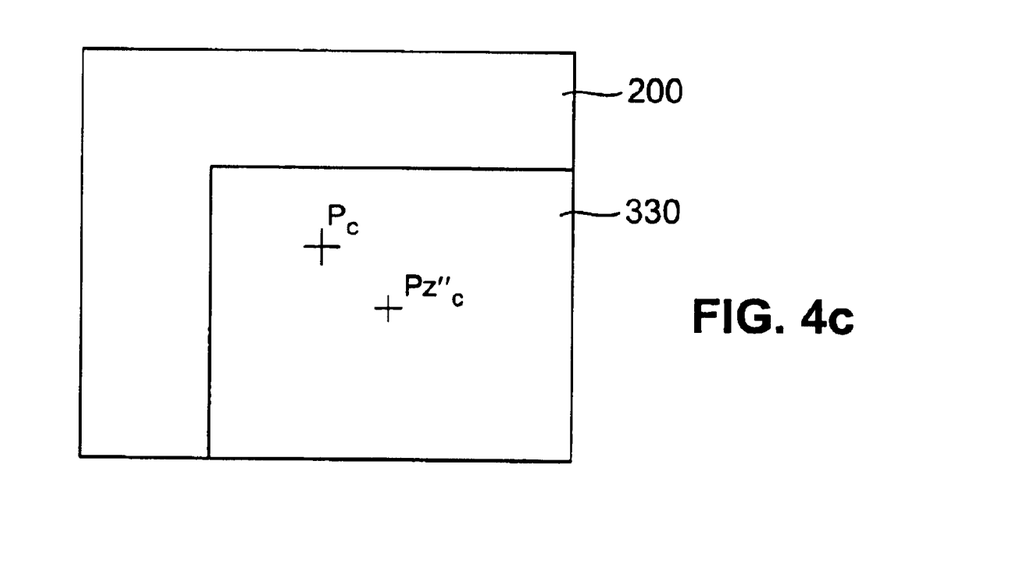

If the image 320 is electronically zoomed out further and reaches a vertical boundary of the image area 200, then both the pan and the tilt positions $Pz_c$ have to be adjusted automatically according to the invention in order to satisfy equation (2) given below. Likewise, the pan and the tilt positions $Pz_c$ have to be adjusted if the zoomed-out image 320 reaches a horizontal boundary of the image area 200. The image 330 illustrated in FIG. 4c is obtained from the image 320 of FIG. 4b by automatically maintaining the right vertical boundary of the zoomed image at the right vertical boundary of the image area 200 while the zoom ratio is decreased. In the example of FIG. 4c, both the right vertical boundary and the lower horizontal boundary of the zoomed image 330 coincide with the respective right vertical boundary and the lower horizontal boundary of the image area 200. The center (pan and the tilt position $Pz_c''$) of the zoomed image 330 is moved upwardly and to the left relative to the center $Pz_c$ of image 320.

In the illustrated example, the zoomed image 330 has a zoom ratio $R_z = 1.26$ as calculated from the original tilt position $(Pz_c - P_c)_{vertical} = -50$ pixels. Accordingly, the zoomed pixel 330 is $640/R_z = 506$ pixels wide, yielding a new pan position $Pz''_c = 0.5 *(640-506) = 67$. The corresponding pixel addresses are again generated by the address generator 160.

Figure 4D:
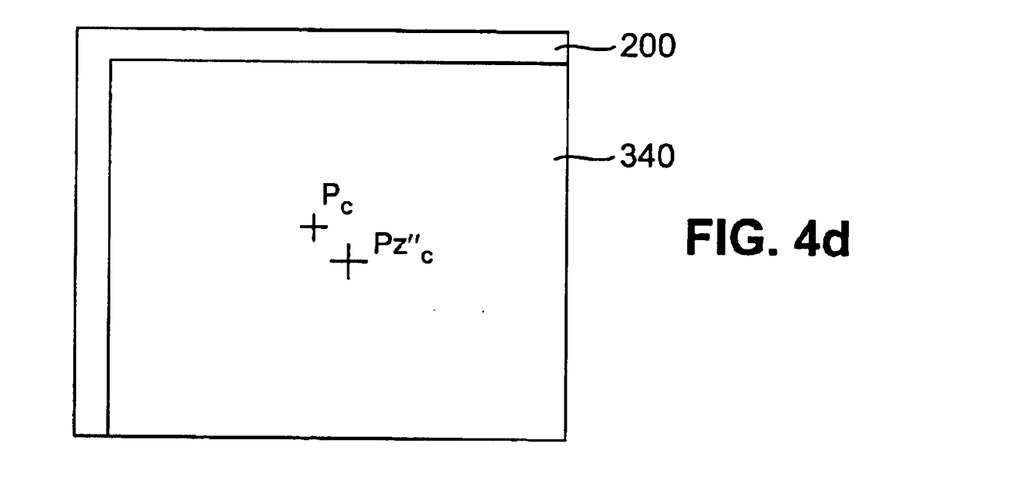

If the zoomed image 330 is electronically zoomed out farther, as indicated by zoomed image 340 in FIG. 4d, both the pan and tilt position of $Pz'''_c$ are adjusted automatically and simultaneously with the zoom adjustment so as to keep the zoomed image 340 within the image sensor area 200. The new pan and tilt position $Pz'''_c$ is preferably calculated by the controller 180 in accordance with the examples described above and with reference to FIG. 4.

Figure 5:
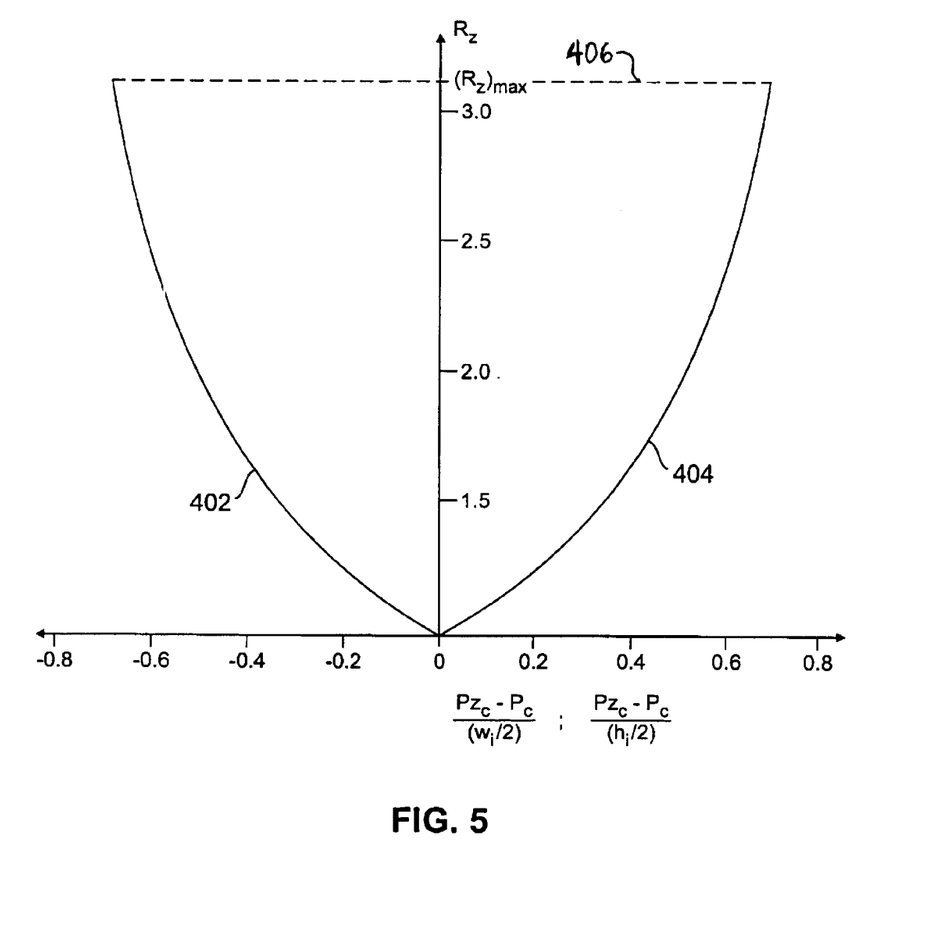
FIG. 5 is the minimum zoom ratio as a function of the pan/tilt position of the zoomed image.

FIG. 5 illustrates the functional dependence of the minimum zoom ratio $R_z$ permitted for a given relative pan position $(Pz_c-P_c)/(w_i/2)$ in the horizontal direction and a given relative tilt position $(Pz_c-P_c)/(h_i/2)$ in the vertical direction. It is evident from the foregoing discussion that the maximum value of the relative pan and tilt positions determines the minimum allowable zoom ratio. As mentioned above, the zoom ratio is expected to be limited to a largest value which is determined by the desired image quality. The curve of FIG. 5 can be described by the equation $$|(Pz_c-P_c)/(w_i/2)|=1-1/R_z \text{ and}$$

$$|(Pz_c-P_c)/(h_i/2)|=1-1/R_z, \text{ respectively.} \quad \text{(Eq. 1)}$$

Consequently, the minimum allowable zoom ratio $R_z$ is:

$$R_z > \max(|(w_i/2)/(w_i/2-(Pz_c-P_c))|,$$

$$|(h_i/2)/(h_i/2-(Pz_c-P_c))|) \quad \text{(Eq. 2)}$$

The allowable zoom ratio $R_z$ is thus located in the region of FIG. 5 which is bounded by the two curves 402 and 404 and by the maximum permissible zoom ratio $R_{z,max}$ as determined by the line 406 and representing the desired image quality, as discussed above. The zoom system of the invention is designed so as to continually monitor and, if necessary, adjust the zoom ratio in response to the pan and/or tilt position and vice versa, so that the zoomed image remains within the pixel area of the image sensor 110, as expressed by Eq. 2.

When the final zoomed/panned/tilted image selected by the user is attained, the Y video signal, C video signal and the horizontal and vertical pixel addresses of the zoomed image are routed via the respective signal paths 162, 164 and 166 to the scaler 170 as illustrated in FIG. 2. Since the zoomed image has less pixels than the full image to be displayed by a monitor (not shown), as mentioned above, new interpolated pixel values are computed by the scaler 170 to provide the full complement of pixels values to be displayed, for example, 640×480 pixels. Additional image processing functions, such as, for example sharpening, can also be performed by the scaler. The scaled image signals are available as Y video, C video and horizontal and vertical pixel addresses at respective scaler outputs 172, 174 and 176.

Figure 6:
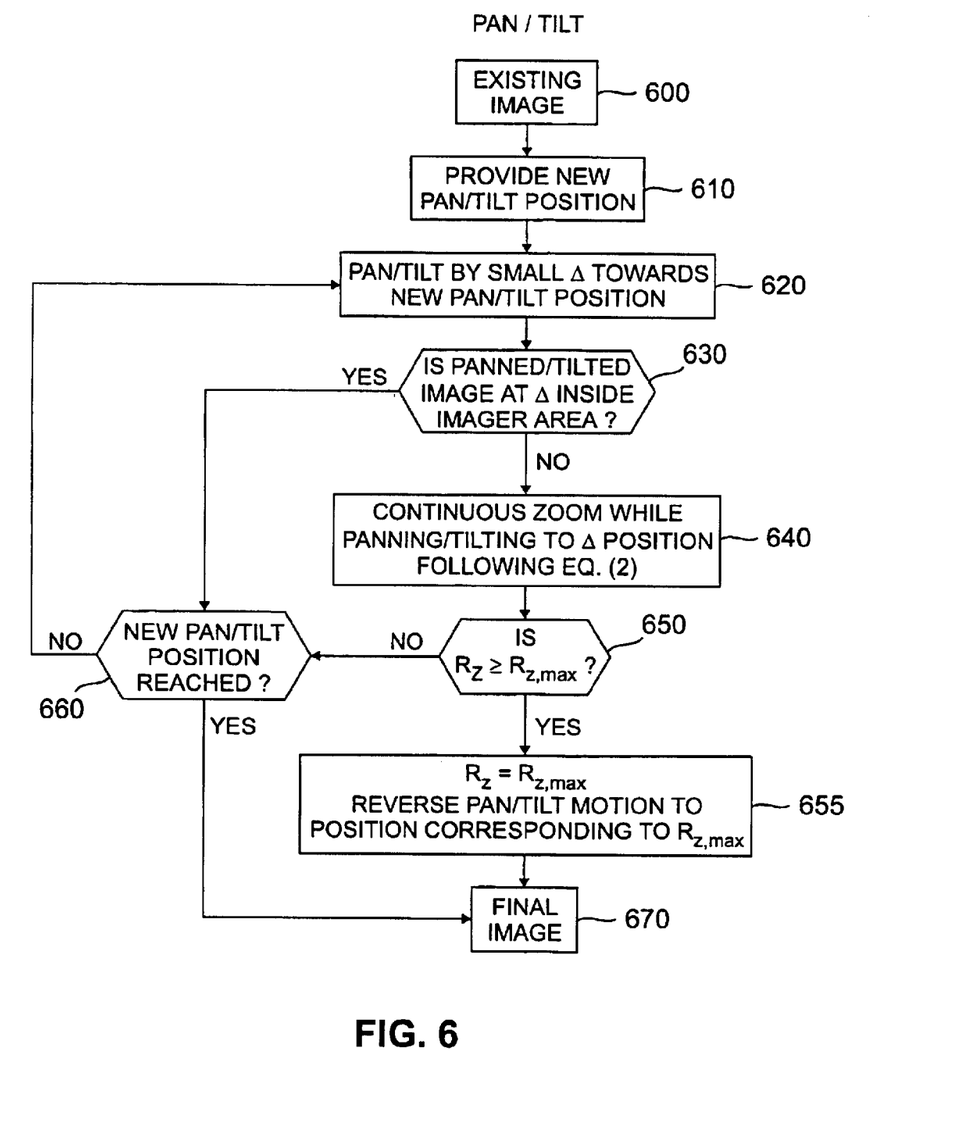
FIG. 6 is a flow diagram for pan/tilt of a zoomed image according to the invention.
Figure 7:
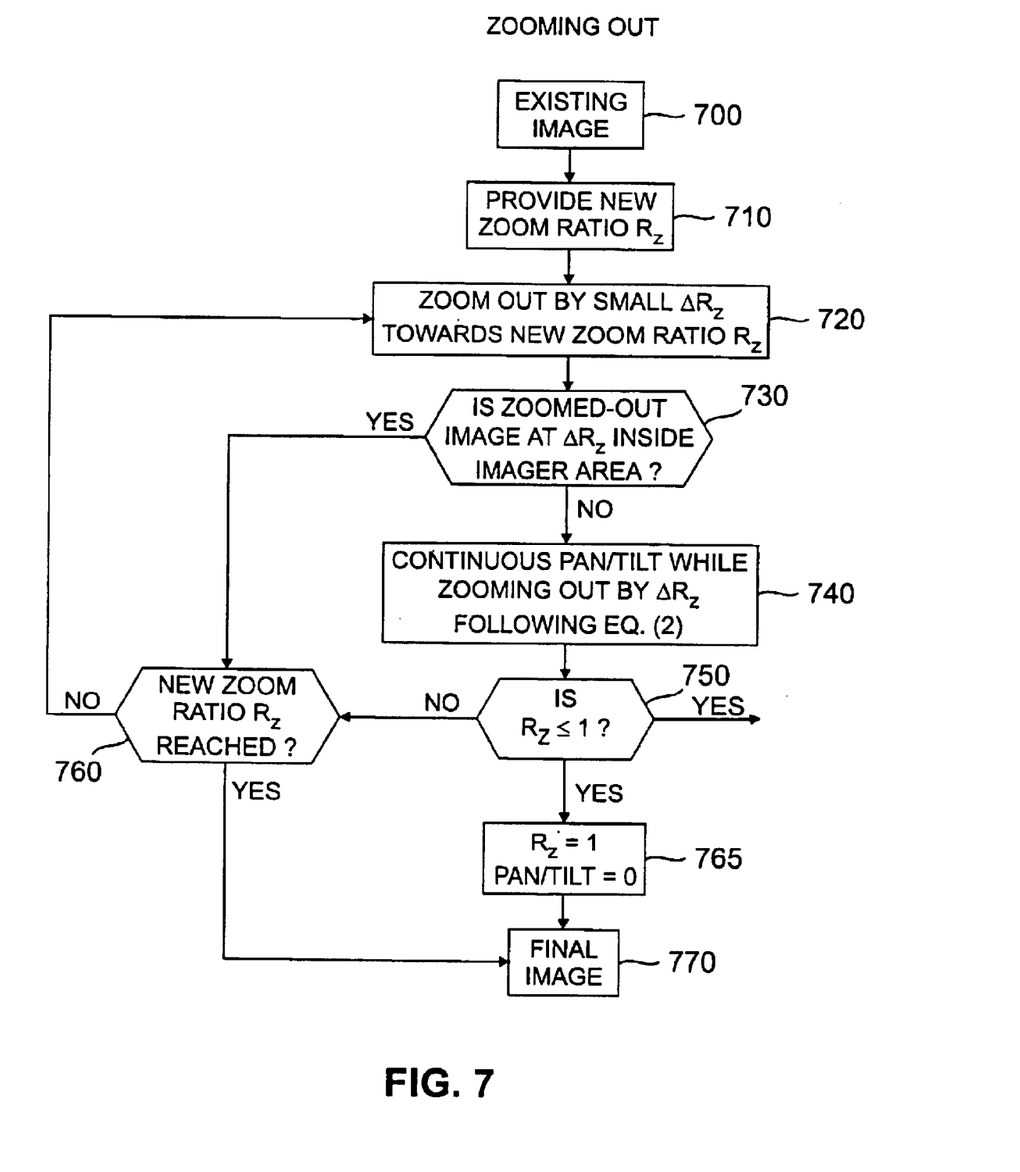
FIG. 7 is a flow diagram for zooming a panned/tilted image according to the invention.

Referring now to FIGS. 6 and 7, there are shown flow diagrams of a preferred method for carrying out the invention. The flow diagram of FIG. 6 relates to a situation where an existing zoomed image 600 with an initial zoom ratio, pan and tilt position is panned and/or tilted electronically. As mentioned above, an image with a zoom ratio of one cannot be panned or tilted. In step 610 a new pan/tilt position is provided, either by a user or automatically in response to camera or environmental signals, as discussed above. In step 620, the image is panned/tilting by Δ towards the new pan/tilt position. When panning/tilting continuously, the Δ position and the new position can be identical. Step 630 then checks if the panned/tilted image at the Δ position is inside the imager area. If this is the case, the next step 660 checks if the new pan/tilt position is reached. If this is the case, the final image is produced in step 670. Otherwise, the process loops back to step 620 where the pan/tilt position is adjusted once more by Δ.

If the image or a portion thereof produced with the pan/tilt position in step 630 is outside the image area, then in step 640 the image is zoomed in according to the zoom ratio calculated for the respective pan/tilt position from Eq. (2). If, as determined in step 650, the zoom ratio $R_z$ is not greater than or equal to the maximum zoom ratio $R_{z,max}$, then the process continues in step 660, discussed above. If, as determined in step 650, the zoom ratio $R_z$ is greater than or equal to the maximum zoom ratio $R_{z,max}$, then in step 655 the zoom ratio $R_z$ is set equal to the maximum zoom ratio $R_{z,max}$ and the pan/tilt motion is reversed to a position corresponding to $R_{z,max}$. The final image is produced in step 670.

The flow diagram of FIG. 7 is similar to that of FIG. 6 and relates to a situation where an existing image 600 with an initial zoom ratio, pan and tilt position is electronically zoomed out, that is, $R_z$ decreases. It is evident that an existing image 700 which is located entirely within the image sensor area 200, can always be zoomed in. In step 710, a new zoom ratio is provided, either by a user or automatically in response to camera or environmental signals, as discussed above. In step 720, the image is zoomed out by $\Delta R_z$ towards the new zoom ratio $R_z$. When zooming continuously, the zoom ratio adjusted by $\Delta R_z$ and the new zoom ratio can be identical. Step 730 then checks if the zoomed-out image at the $\Delta R_z$ zoom ratio is inside the imager area. If this is the case, the next step 760 checked if the new zoom ratio is reached. If this is the case, the final image is produced in step 770. Otherwise, the process loops back to step 720 where the zoom ratio is adjusted once more by $\Delta R_z$.

If the zoomed-out image produced with the adjusted zoom ratio in step 730 or a portion thereof is outside the imager area, then in step 740 the image is panned/tilted according to the pan/tilt position calculated for the respective zoom ratio from Eq. (2). If, as determined in step 750, the zoom ratio $R_z$ is not less than or equal to one, then the process continues in step 760, discussed above. If, as determined in step 750, the zoom ratio $R_z$ is less than or equal to one, then in step 765 the zoom ratio $R_z$ is set equal to one and the pan/tilt position is set to zero. The final image is produced in step 770.

The foregoing is considered to be illustrative only of the principles of the invention. Modifications of the preferred embodiments disclosed herein will be apparent to those skilled in the art that are within the scope of the following claims.

What is claimed is:

1. An adaptive electronic zoom system having electronic pan and tilt capability, comprising a camera comprising an image sensor, said image sensor defining an imager area with an imager width, an imager height and an imager center;

a controller responsive to at least an input signal, the controller generating control signals;

an address generator responsive to the control signals and adapted to select a zoom area located within the imager area, said zoom area having a zoom width, a zoom height and a zoom center, wherein the imager width and imager height divided by the respective zoom width and zoom height, respectively, define a zoom ratio and wherein the horizontal distance between said zoom center and said image center defines a pan position and the vertical distance between said zoom center and said image center defines a tilt position;

wherein the controller automatically increases the zoom ratio as a function of the respective pan and tilt position so that the zoom area is located entirely within the imager area.

2. The zoom system of claim 1, firer comprising a scaler for scaling video signal information from said zoom area to a format suitable for at least one of display, transmission and storage.

3. The zoom system of claim 1, wherein the controller automatically increases the zoom ratio if changes in at least one of the pan and tilt positions causes at least a portion of the zoom area to be located outside the imager area.

4. The zoom system of claim 1, wherein the controller automatically adjusts at least one of the pan and tilt positions if a change in the zoom ratio causes at least a portion of the zoom area to be located outside the imager area.

5. The zoom system of claim 1, wherein said camera is a part of a video conferencing system comprising a set-top box.

6. The zoom system of claim 1, wherein said image is formed by an optical system with a fixed focal length.

7. The zoom system of claim 1, wherein said input signal is generated by a user.

8. The zoom system of claim 1, wherein said camera has a camera feedback signal and said camera feedback signal is generated by the image sensor.

9. The zoom system of claim 8, wherein said camera feedback signal is caused by the movement of an object to be imaged.

10. The zoom system of claim 8, wherein said camera feedback signal is caused by a predetermined color attribute of an object to be imaged.

11. The zoom system of claim 1, wherein said input signal is an audio signal.

12. The zoom system of claim 1, wherein said input signal is an optical signal.

13. An adaptive electronic zoom system having electronic pan and tilt capability, comprising a camera comprising an image sensor, said image sensor defining an imager area with an imager width, an imager height and an imager center;

a controller responsive to at least an input signal, the controller generating control signals;

zoom width, a zoom height and a zoom center and located within the imager area, wherein said zoom width and zoom height, respectively, relative to the respective imager width and imager height define a zoom ratio and wherein the horizontal distance between said zoom center and said image center defines a pan position and the vertical distance between said zoom center and said image center defines a tilt position;

wherein said zoom ratio is automatically adjusted by the controller so that for a predetermined pan and tilt position the zoom ratio is no less than the maximum of the absolute value of half the imager width divided by the difference between half the imager width and the pan position, and the absolute value of half the imager height divided by the difference between half the imager height and the tilt position.

14. An imaging device with integrated electronic zoom/pan/tilt functions comprising:

an image acquisition system which generates an electronic image, said electronic image having an image area with an image width, an image height and an image center;

a controller responsive to an input signal and generating control signals;

an address generator responsive to the control signals and adapted to select a zoom area located within the image area, said zoom area having a zoom width, a zoom height and a zoom center, wherein the imager width and imager height, respectively, divided by the respective zoom width and zoom height define a zoom ratio, and wherein the horizontal distance between said zoom center and said image center defines a pan position and the vertical distance between said zoom center and said image center defines a tilt position;

wherein the controller automatically adjusts, if necessary, at least one of the pan and tilt positions in response to a decrease in the zoom ratio, so that no portion of the worn area is located outside the image area; and, the controller automatically increases the zoom ratio, if necessary in response to a change in at least one of the pan and tilt positions, so that no portion of the zoom area is located outside the image area.

15. The imaging device of claim 14, wherein the image acquisition system is a scanner.

16. The imaging device of claim 14, wherein the image acquisition system is a video receiver receiving video signals.

17. The imaging device of claim 14, wherein the input signal is generated by a user.

18. The imaging device of claim 14, further comprising a scaler for scaling video signal information from said zoom area to a format suitable for at least one of display, transmission and storage.

19. A method of controlling an adaptive electronic zoom system with electronic pall and tilt capability of an electronic image sensor comprising imager pixels, comprising the steps of:

selecting from said imager pixels a contiguous subset of pixels wherein the subset of pixels has dimensions so as to define a zoom ratio and a pan and tilt position;

adjusting said zoom ratio in response to changes in at least one of the pan and tilt positions;

wherein the zoom ratio is automatically increased, if necessary, m response to changes in at least one of the pan and tilt positions so that no portion of the image defined by a changing pan and tilt position is located outside the imager pixels.

20. The method of claim 19 wherein said increase in the zoom ratio is performed simultaneously with said change in at least one of the pan and tilt positions.

21. A method for controlling an adaptive electronic zoom system with electronic pan and tilt capability of an electronic image sensor comprising imager pixels, comprising the steps of:

selecting from said imager pixels a contiguous subset of pixels where the subset of pixels has dimensions so as to define a zoom ratio and a pan and tilt position;

automatically adjusting, if necessary, at least one of the pan and tilt positions in response to changes in the zoom ratio;

wherein the pan and tilt position changes in response to changes in the zoom ratio so that no portion of the image defined by a changing zoom ratio is located outside the imager pixels.

22. A method for controlling an adaptive electronic zoom system with electronic pan and tilt capability, comprising the steps of:

defining a zoom ratio for selecting a zoom area from an image area;

defining at least one of a pan and tilt position of the zoom area;

automatically adjusting, if necessary, one of the pan and tilt positions in response to a decrease in the zoom ratio, so that no portion of the zoom area is located outside the image area; and, automatically increasing, if necessary, the zoom ratio in response to a change in at least one of the pan and tilt positions so that no portion of the zoom area is located outside the image area.

23. A video camera system with electronic zoom/pan/tilt functions for a set-top box, comprising:

a video camera operatively integrated in said set-top box and adapted to acquire an electronic image of an object, said image having an image area with an image width, an image height and an image center;

a controller responsive to an input signal and generating control signals;

an address generator responsive to the control signals and adapted to select a zoom area located within the image area, said zoom area having a zoom width, a zoom height and a zoom center, wherein the imager width and imager height, respectively, divided by the respective zoom width and zoom height define a zoom ratio, and wherein the horizontal distance between said zoom center and said image center defines a pan position and the vertical distance between said zoom center and said image center defines a tilt position;

wherein the controller automatically adjusts, if necessary, at least one of the pan and tilt positions in response to a decrease in the zoom ratio, so that no portion of the zoom area is located outside the image area; and, the controller automatically increases the zoom ratio, if necessary, in response to a change in at least one of the pan and tilt positions, so that no portion of the zoom area is located outside the image area.

24. The video camera system of claim 23, further comprising microphone means capable of determining a location of the object and providing the input signal to the controller based on said location.

25. The video camera system of claim 23, wherein the input signal is generated in response to a signal from a remote control device.

26. The video camera system of claim 23, further comprising a scaler for scaling video signal information from said zoom area to a format suitable for at least one of display, transmission and storage.

\* \* \* \* \*

UNITED STATES PATENT AND TRADEMARK OFFICE
CERTIFICATE OF CORRECTION

PATENT NO. : 6,704,048 B1
DATED : March 9, 2004
INVENTOR(S) : Kenneth W. Malkin et al.

It is certified that error appears in the above-identified patent and that said Letters Patent is hereby corrected as shown below:

Column 9,
Line 1, after "zoom system of claim 1," delete "firer" and insert in its place -- further --

Column 10,
Line 11, delete "worn" and insert in this place -- zoom --.
Line 28, after "system with electronic," delete "pall" and insert in its place -- pan --.
Line 37, after "necessary," delete "m" and insert in its place -- in --.
Line 67, after "if necessary," insert -- at least --.

Signed and Sealed this

Twenty-second Day of June, 2004

JON W. DUDAS
*Acting Director of the United States Patent and Trademark Office*